United States Patent Office 2,838,468
Patented June 10, 1958

2,838,468

PROCESS FOR PREPARING AMINOPLASTS IN BEAD FORM COMPRISING REACTING AMINE-ALDEHYDE RESINS WITH ANIONIC POLY-ELECTROLYTES

William A. Laurie, Springfield, Mass., assignor to Monsanto Chemical Company, St. Louis, Mo., a corporation of Delaware No Drawing. Application May 25, 1953
Serial No. 357,367

10 Claims. (Cl. 260—45.2)

This invention relates to aminoplasts. More particularly the invention relates to modified aminoplasts and to a process for preparing the modified aminoplasts in bead form.

Aminoplasts may be defined as condensation products of organic compounds containing a plurality of amine, amide, imine or imide groups with an aldehyde or ketone. The condensation is usually carried out in an aqueous medium to obtain resins which may be soluble or insoluble in water according to the particular conditions used. These products are normally still fusible, the major exception being in the production of ion exchange resins which should be both insoluble and infusible.

In the normal operation of the condensation process, it is possible to stop the reaction at any desired point and recover the solid product from the reaction medium by such conventional drying processes as spray drying, drum drying, oven drying, etc. The products recovered in these drying processes are usually in a pulverulent amorphous form. The drying step is cumbersome and expensive and the dried products present problems of dusting and caking. For some purposes, the pulverulent form is not at all useful, e. g., in ion exchange applications.

One object of this invention is to modify aminoplasts.

A further object is to provide aminoplasts in bead form.

Another object is to provide a process for the preparation of aminoplasts in bead form.

These and other objects are attained by heating an aqueous solution or dispersion of an aminoplast with an anionic polyelectrolyte.

The following examples are given in illustration and are not intended as limitations on the products and processes of this invention. Where parts are mentioned, they are parts by weight.

Example I

React together 126 parts of melamine and 200 parts of formalin (37% formaldehyde) at reflux temperature and atmospheric pressure to a 25° C. cloud point to obtain an aqueous solution of a melamine-formaldehyde condensate. Dilute the solution with water to about 50% solids by weight while cooling the solution to about 60° C. Add one part of a copolymer of vinyl acetate and maleic anhydride having a molecular weight of about 60,000. The copolymer is soluble in water and dissolves readily in the reaction medium. Now raise the temperature of the reaction medium to about 90° C. and maintain said temperature until the reaction medium starts to become cloudy and for about three minutes after the first appearance of haze. Dilute the reaction medium with water to about 30% solids while maintaining the temperature at about 85° C. and then cool to room temperature. Maintain constant agitation throughout the entire reaction. The product is a suspension in water of large beads of the melamine-formaldehyde condensate. The beads may be recovered from the solution by simple filtration. The beads are not water-soluble but they are still fusible. The beads may be molded without modification or they may be compounded with fillers, pigments, dyes, lubricants, etc. and then molded. No catalyst is needed to cure the resin to the infusible state.

Example II

React together 126 parts of melamine and 200 parts of formalin (37% formaldehyde) at reflux temperature and atmospheric pressure and at a pH of from 8 to 9 until a 25° C. cloud point is reached. Cool the reaction medium to about 60° C. and add 20 parts of para-toluene sulfonamide and adjust the pH to from 7 to 8. Heat the reaction medium at about 60° C. to a 17° C. cloud point. Now adjust the solids to about 50% by adding water thereto and add one part of a copolymer of vinyl acetate and maleic anhydride. Raise the reaction temperature to about 90° C. and maintain said temperature until the reaction medium begins to appear cloudy and continue the heating for about five minutes after the first appearance of the cloud. Add water to dilute the reaction medium to a 30% solids content while maintaining the temperature at 85° C. or above and then cool the reaction medium to room temperature. Maintain constant agitation throughout the reaction. The product is a dispersion of beads in water. The beads may be recovered from the water by filtration. They are fusible and insoluble in water and have a relatively high flow under conventional molding conditions.

Example III

React together 126 parts of melamine, 240 parts of formaldehyde and 140 parts of n-butanol at reflux temperature and atmospheric pressure and at a pH of from 6 to 7 for about one hour. To this product add one part of a copolymer of vinyl acetate and maleic anhydride having a molecular weight of about 60,000 and then heat the reaction medium at about 90° C. until a haze appears. Continue the reaction for a few minutes after the appearance of haze and then dilute with water to about 30% solids while maintaining the temperature at 85° C. or above. Maintain constant agitation throughout the reaction. On cooling, it is found that the product is an aqueous dispersion of beads. The beads are found to be fusible and insoluble in water. They may be cured to an infusible state at from 100 to 250° C. preferably under pressures up to 1000 p. s. i.

Example IV

React together 126 parts of melamine and 200 parts of formalin at a pH of from 8 to 9 at reflux temperature and atmospheric pressure to a 25° C. cloud point. Cool the solution to about 60° C. and add 50 parts of para-toluene sulfonamide and adjust the pH to about 7–8. Heat the solution at about 60° C. to a 17° C. cloud point and then adjust the solids content to about 50% by dilution with water. Now add 1.3 parts of glyceryl monoricinoleate and 1.7 parts of a copolymer of vinyl acetate and maleic anhydride having a molecular weight of about 60,000 and heat the solution at about 90° C. until a haze appears in the reaction medium and for about three minutes thereafter. Dilute the reaction medium with water to about 30% solids by weight while maintaining the temperature at about 85° C. and then cool the product. Maintain constant agitation throughout the reaction. The product is an aqueous dispersion of beads of condensation product. The beads may be recovered from the dispersion by filtration. The beads are nearly transparent and fusible, and are considerably smaller than the beads of the preceding examples.

Example V

Repeat Example IV, replacing the glyceryl monoricinoleate with 2 parts of sodium oleate. The product is similar to that obtained in Example IV with the exception that the beads are somewhat smaller.

Example VI

React together 126 parts of melamine with 200 parts of formalin at reflux temperature and atmospheric pressure at a pH of from 8 to 9 to a 25° C. cloud point. Add 10 parts of a copolymer of styrene and maleic anhydride having a molecular weight of about 75,000 and heat the reaction mixture at reflux temperature and atmospheric pressure until the reaction medium becomes cloudy and for a few minutes thereafter. Then dilute the reaction medium with water to about 30% solids at a temperature of at least 80° C. Maintain constant agitation throughout the reaction. The product is a dispersion of beads of melamine-formaldehyde condensate in a fusible but water-insoluble form. The beads may be recovered from the dispersion by filtration. The beads may be used as a molding powder in which form they present no problem of dusting or caking.

Example VII

React together 120 parts of urea and 200 parts of formalin at reflux temperature and atmospheric pressure at a pH of about 7 for about 30 minutes. Then cool the solution to about 60° C. and add thereto 5 parts of a copolymer of isobutylene and maleic anhydride. Heat the reaction medium at about 85° C. until a definite haze appears and for about five minutes thereafter. Dilute the reaction medium with water at a temperature of about 85° C. and then cool to room temperature. Maintain constant agitation throughout the reaction. The product is an aqueous dispersion of discrete beads. The beads can be recovered by filtration. They are insoluble in water and fusible. They may be used as a molding powder.

There are three essential ingredients for the compositions of this invention: (1) a nitrogen-containing organic compound, (2) an aldehyde or ketone reactive therewith, and (3) an anionic polyelectrolyte. The nitrogen-containing organic compound is an organic compound containing a plurality, i. e., two or more, radicals derived from ammonia. More specifically, the radicals derived from ammonia include amino, amido, imino and imido radicals. Among the nitrogen-containing organic compounds which may be used are carbamides, e. g., urea, thiourea, dicyandiamide, aminotriazines, e. g., melamine, ammeline, etc., polyamines, e. g., hexamethylene diamine, phenylene diamine, etc., imino compounds, e. g., 2 - oxo - 4,5 - diimino parabanic acid, imido compounds, e. g., guanidine, biguanides, etc.

The second essential ingredient is an aldehyde or ketone. Formaldehyde is the most readily available and most reactive of this class of compounds and will generally be preferred. To obtain special effects, part or all of the formaldehyde may be replaced by other aldehydes and ketones such as acetaldehyde, butyraldehyde, heptaldehyde, octaldehyde, benzaldehyde, furfural, acetone, methyl ethyl ketone, cyclohexanone, etc. The amount of aldehyde or ketone used will be based on the number of active hydrogen atoms attached to the nitrogen atoms available in the organic compound. The amount may range from 0.2 to 1 mol of aldehyde or ketone per active hydrogen on the nitrogen atoms. Thus, with melamine which contains 6 active hydrogen atoms attached to nitrogen, the amount of formaldehyde may be varied between 1.2 and 6 mols per mol of melamine.

The third essential ingredient is an anionic polyelectrolyte containing no radicals derived from ammonia such as amino, amido, imino, or imido radicals. Such polyelectrolytes are polymers and copolymers of polymerizable carboxylic acids and the anhydrides thereof. They should have a molecular weight of at least 10,000 and preferably from 40,000 to 100,000. Among the materials falling within this classification are homopolymers of acrylic and alpha-substituted acrylic acids. These homopolymers may be prepared by polymerization of the corresponding monomers or by complete hydrolysis of polymers of the nitriles thereof. Copolymers of the acrylic acids with vinylidene monomers containing no ionic groups such as vinyl esters, aliphatic olefins, olefins substituted by aromatic groups and polyolefins such as butadiene may also be used provided that at least 25 mol percent of the copolymer is derived from the acrylic acid. The water-soluble salts of these materials are equally as useful as the acids themselves.

Another group of polyelectrolytes that may be used are the copolymers of vinylidene compounds containing no ionic groups with the butene dioic acids such as maleic, fumaric, citraconic, itaconic, etc. acids. Copolymers such as the vinyl acetate-maleic anhydride, isobutylene-maleic anhydride and the styrene-maleic anhydride copolymers of the examples are particularly useful either in the acidic form or as the alkali or alkaline earth metal salts thereof.

The operable anionic polyelectrolytes are either polymers of polymerizable carboxylic acids or copolymers thereof in which the acid constitutes at least 25 mol percent of the copolymer. They may be used as acids or as the alkali metal or alkaline earth metal salts thereof but the ammonium salts, quaternary ammonium salts and salts of other metals are inoperative. Furthermore, there should be no amine, imine, imide or amide groups present in the polyelectrolyte. The amount of polyelectrolyte may be varied between 1% and 50% by weight based on the total weight of solids in the final composition.

The compositions of this invention may be modified by the further reaction of the first two components with alcohols, phenols, aryl sulfonamides, etc. The amount of modifier used may vary from 0.5 to 1 mol per mol of aldehyde or ketone used.

The process of this invention comprises two essential steps. The first step is the condensation reaction between the nitrogen-containing organic compound and the aldehyde or ketone. This reaction is usually carried out in an aqueous alkaline medium for ease of control. The reaction is ordinarily stopped at or near the point of incipient insolubility in water although for some purposes it may be desirable to continue the reaction until the condensate is completely insoluble in water but still fusible. The point of incipient insolubility is the cloud point or the point at which at a given temperature the reaction mixture becomes cloudy. Depending on the particular end use for which the resin is being prepared, the cloud point may be determined at 25° C. or 0° C. or at any point in between which represents the desired degree of solubility. Continuous agitation throughout this step is desirable although not absolutely necessary.

The second step is the addition of the polyelectrolyte followed by continued heating of the reaction mixture at from 80° C. to 100° C. The addition of the polyelectrolyte appears to slow down the condensation reaction to some extent since no haze of insoluble condensation product appears in the reaction medium for some time after the addition. To prepare insoluble, fusible products, the reaction should be continued until a definite haze does appear and thereafter for from 3 to 10 minutes. Constant agitation should be maintained throughout this step. The beads of condensation product are formed during the heating beyond the first appearance of haze. The size of the beads is governed partially by the amount of polyelectrolyte used, partially by the agitation and partially by the concentration of the reactants in water. The process is usually carried out at about 50% solids by weight and for some end uses the final reaction product may be used without further dilution or recovery of the beads from the water.

The exact function of the polyelectrolytes in the process and products of this reaction is not clear. They appear to react with or form quasi-chemical linkages with the condensates since they cannot be washed out of the beads even by prolonged washing with hot water. As a result, the resins, while in the bead form, are permanently self-dispersing in aqueous media.

If it is desired to further control the diameter of the beads, such control may be obtained by the inclusion in the reaction media along with the polyelectrolytes, of a nonionic or anionic emulsifying agent such as the glyceryl monoricinoleate or the sodium oleate of the examples. The added emulsifiers serve to further decrease the particle size of the beads. They may be used in proportions ranging from 1% to 15% by weight based on the total solids. Ordinarily, these added emulsifiers will increase the water-sensitivity of the products made with the beads but this may be avoided if desired by recovering the beads from the reaction product and washing them with water. The washing process leaches out the added emulsifier but does not remove the polyelectrolyte or affect the dispersibility of the beads in water.

When modifiers such as alcohols, phenols or aryl sulfonamides are used, they should be condensed with the nitrogen-containing organic compound and the aldehyde or ketone either after the first condensation product is prepared or simultaneously with its preparation. It will be necessary to vary the pH conditions of the first step to suit the particular additive. The alcohols, for instance, will require a slightly acid medium and the aryl sulfonamides will require a medium having a pH of from 7 to 8. These conditions are well-known in the art of making aminoplast resins.

The products of this invention are particularly valuable for use as molding powders since they may be recovered from the reaction medium by simple filtration, i. e., high temperature drying steps are eliminated. The dry beads are non-dusting and non-caking but are quite soft and fusible at slightly elevated temperatures so that compounding operations to incorporate conventional additives may be easily and efficiently carried out. Furthermore, the resins of this invention, whether in the bead form or in the compounded form, flow more readily than unmodified melamine resins under conventional molding conditions.

In one embodiment of this invention, a relatively large amount of polyelectrolyte is used, e. g., from 25 to 50% by weight, and the reaction is continued after the addition of the polyelectrolyte until the resin is cured to an infusible state. The infusible beads are useful as ion-exchange resins.

What is claimed is:

1. A process for preparing water-insoluble fusible aminoplasts in bead form which comprises essentially forming a reaction medium by reacting a nitrogen-containing organic compound taken from the group consisting of urea, thiourea, dicyandiamide, melamine, ammeline, hexamethylene diamine, phenylene diamine, 2-oxo-4,5-diimino parabanic acid and guanidine with a carbonyl compound taken from the group consisting of aldehydes and ketones in an aqueous alkaline medium to the point of incipient insolubility in water, said compounds being present in a mol ratio ranging between 0.2 to 1.0 of carbonyl compound per active hydrogen atom attached to nitrogen atoms of said organic compound, and thereafter adding to the reaction medium as the sole additive an anionic polyelectrolyte and heating said medium at 80–100° C. until beads are formed, said anionic polyelectrolyte being a member of the group consisting of homopolymers of acrylic acids, copolymers of non-ionic vinylidene monomers with acrylic acids and copolymers of nonionic vinylidene monomers with butene-dioic acids, the acid monomer in said anionic polyelectrolytes constituting at least 25 mol percent thereof, the amount of polyelectrolyte in the product being restricted to from 1 to 50% based on the total solids thereof.

2. A process as in claim 1 wherein the organic compound is urea.

3. A process as in claim 1 wherein the organic compound is melamine.

4. A process as in claim 1 wherein the carbonyl group is formaldehyde.

5. A process as in claim 1 wherein the polyelectrolyte is a copolymer of a non-ionic vinylidene monomer with a butene dioic acid.

6. A process as in claim 1 wherein the polyelectrolyte is a copolymer of vinyl acetate and maleic acid.

7. A process as in claim 1 wherein an aryl sulfonamide is co-condensed with the organic compound and the carbonyl compound prior to reaction with the polyelectrolyte.

8. A process as in claim 7 wherein the sulfonamide is para-toluene sulfonamide.

9. A process for preparing water-insoluble fusible aminoplasts in bead form which comprises essentially forming a reaction medium by reacting a nitrogen-containing organic compound taken from the group consisting of urea, thiourea, dicyandiamide, melamine, ammeline, hexamethylene diamine, phenylene diamine, 2-oxo-4,5-diimino parabanic acid and guanidine with a carbonyl compound taken from the group consisting of aldehydes and ketones and an alcohol in an aqueous acidic medium to the point of incipient insolubility in water, said compounds being present in a mol ratio ranging between 0.2 to 1.0 of carbonyl compound per active hydrogen atom attached to nitrogen atoms of said organic compound, the amount of alcohol being present in a mol ratio ranging between 0.5 to 1.0 per mol of carbonyl compound, and thereafter adding to the reaction medium as the sole additive an anionic polyelectrolyte and heating said medium at 80–100° C. until beads are formed, said anionic polyelectrolyte being a member of the group consisting of homopolymers of acrylic acids, copolymers of non-ionic vinylidene monomers with acrylic acids and copolymers of non-ionic vinylidene monomers with butene dioic acids, the acid monomer in said anionic polyelectrolyte constituting at least 25 mol percent thereof, the amount of polyelectrolyte in the product being restricted to from 1 to 50% based on the total solids thereof.

10. A process as in claim 9 wherein the alcohol is n-butanol.

References Cited in the file of this patent

UNITED STATES PATENTS

| 2,227,200 | Robie | Dec. 31, 1940 |
| 2,245,491 | Menger et al. | June 10, 1941 |
| 2,300,976 | Scheuermann | Nov. 3, 1942 |
| 2,411,590 | Powell | Nov. 26, 1946 |
| 2,537,016 | Barrett | Jan. 9, 1951 |
| 2,537,019 | Barrett | Jan. 9, 1951 |
| 2,653,140 | Allenby et al. | Sept. 22, 1953 |
| 2,708,645 | Norman | May 17, 1955 |